(12) United States Patent
Kelloniemi et al.

(10) Patent No.: US 10,575,110 B2
(45) Date of Patent: *Feb. 25, 2020

(54) METHOD AND SYSTEM OF VARYING MECHANICAL VIBRATIONS AT A MICROPHONE

(71) Applicant: MICROSOFT TECHNOLOGY LICENSING, LLC, Redmond, WA (US)

(72) Inventors: Antti Pekka Kelloniemi, Kirkland, WA (US); Ross Garrett Cutler, Clyde Hill, WA (US); Sailaja Malladi, Kirkland, WA (US); Tommi Antero Raussi, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/365,616

(22) Filed: Mar. 26, 2019

(65) Prior Publication Data
US 2019/0320277 A1 Oct. 17, 2019

Related U.S. Application Data

(63) Continuation of application No. 15/953,382, filed on Apr. 13, 2018.

(51) Int. Cl.
*H04R 29/00* (2006.01)
*H04R 3/04* (2006.01)
*H04R 1/02* (2006.01)

(52) U.S. Cl.
CPC .......... *H04R 29/002* (2013.01); *H04R 1/025* (2013.01); *H04R 3/04* (2013.01); *H04R 2499/11* (2013.01)

(58) Field of Classification Search
CPC ........ H04R 29/002; H04R 1/025; H04R 3/04; H04R 2499/11
See application file for complete search history.

(56) References Cited

U.S. PATENT DOCUMENTS

| | | | |
|---|---|---|---|
| 2011/0293104 A1* | 12/2011 | Saplakoglu | H04M 9/082 381/66 |
| 2012/0070022 A1* | 3/2012 | Saiki | H04R 9/063 381/312 |

(Continued)

FOREIGN PATENT DOCUMENTS

| | | |
|---|---|---|
| DE | 3800855 A1 | 7/1989 |
| WO | 2017041284 A1 | 3/2017 |

OTHER PUBLICATIONS

"Arendal Sound Introduce 1723 S Series Speakers", Retrieved from: https://hifipig.com/arendal-sound-introduce-1723-s-series-loudspeakers/, Nov. 15, 2017, 07 Pages.

(Continued)

*Primary Examiner* — Mohammad K Islam
(74) *Attorney, Agent, or Firm* — NovoTechIP International PLLC

(57) ABSTRACT

An improved method and system for varying an amount of mechanical coupling in a speakerphone is disclosed. Solutions and implementations provided vary the amount of mechanical coupling between one or more speakers and one or more microphones of the speakerphone to generate high-quality sounds. Implementations include receiving an input signal, sending a copy of the input signal to a first speaker, performing a signal transformation on the input signal to produce a transformed input signal, and transmitting the transformed input signal to a second speaker, where the first speaker generates a first vibration force in response to the input signal, and the second speaker generates a second vibration force in response to the transformed input signal, (Continued)

the second vibration force being in an opposite direction to that of the first vibration force and offsetting at least part of the first vibration force.

19 Claims, 6 Drawing Sheets

(56) References Cited

U.S. PATENT DOCUMENTS

2016/0314777 A1* 10/2016 Yu ........................ H04R 29/00
2017/0142262 A1* 5/2017 Sorensen ............ H04M 1/6041
2017/0162183 A1* 6/2017 Zhao ................... G10K 11/178

OTHER PUBLICATIONS

"Dual opposing drivers", Retrieved from: https://www.arendalsound.eu/pages/dual-opposing-drivers, Nov. 15, 2017, 02 Pages.
"Introducing the MicroSub45", Retrieved from: https://barefootsound.com/audio/introducing-the-microsub45/, Jan. 22, 2018, 03 Pages.
"MicroSub45", Retrieved from: https://barefootsound.com/microsub45/, Retrieved Date: Apr. 10, 2019, 05 Pages.
"What is a dual force canceling speaker?—diyAudio", Retrieved from: https://www.diyaudio.com/forums/multi-way/174616-dual-force-canceling-speaker.html, Oct. 1, 2010, 05 Pages.
"International Search Report and Written Opinion Issued in PCT Application No. PCT/US19/016202", dated Apr. 26, 2019, 16 Pages.

* cited by examiner

METHOD AND SYSTEM OF VARYING MECHANICAL VIBRATIONS AT A MICROPHONE

CROSS REFERENCE TO RELATED APPLICATION

This application claims the benefit of and priority to U.S. application Ser. No. 15/953,382, entitled "Method And System of Varying Mechanical Vibrations At a Microphone," filed on Apr. 13, 2018, the entirety of which is incorporated by reference herein.

TECHNICAL FIELD

This disclosure relates generally to improving design of speakerphones and, more particularly, to a system and method of varying signal coupling between one or more speakers and one or more microphones in a speakerphone.

BACKGROUND

With the rise in use of small electronic devices such as mobile phones in recent years, there has been a significant increase in the need for designing and producing high quality speakerphones that are small in size. A key design challenge for such small speakerphones is to minimize coupling between the one or more microphones and the one or more speakers. The coupling is composed of acoustic, mechanical, and electrical coupling.

In general, reducing electrical coupling in a speakerphone is less challenging than minimizing acoustic and mechanical coupling. Various methods have been used in the industry to reduce acoustic and mechanical coupling, but most have several disadvantages. For example, some high-quality speakerphones minimize mechanical coupling by using rubber mounts for the speaker and/or microphones. The rubber mounts, however, tend to occupy a lot of space and to be fragile, thus creating a significant design challenge for speakerphones that need to fit within a small space and be robust.

An alternative method of reducing acoustical and mechanical coupling involves creating distance between the one or more microphones and the speaker. This also raises the issue of size in speakerphones which are often designed as accessories for mobile devices or personal computers.

SUMMARY

Apparatuses and methods of varying an amount of mechanical coupling in a speakerphone are described. Disclosed apparatuses include a system having a microphone, a first speaker configured for receiving a first input signal, a second speaker configured for receiving a second input signal, and a coupling block positioned between the first speaker and the second speaker, wherein the first speaker faces a first direction and the second speaker faces a second direction opposite that of the first direction, and the second speaker is configured so that, in response to the second input signal, it generates a second vibration force that is in an opposite direction to that of a first vibration force generated by the first speaker and offsets at least part of the first vibration force generated by the first speaker.

In at least one implementation, disclosed systems include a system having a microphone, a first speaker configured for receiving a first input signal and generating a first vibration force, a signal transformation unit receiving the first input signal and performing a signal transformation thereon to produce a transformed input signal for varying an amount of mechanical vibration at the microphone, and a second speaker configured for receiving the transformed input signal and generating a second vibration force, wherein the second vibration force is in an opposite direction to that of the first vibration force and offsets at least part of the first vibration force to vary the amount of mechanical vibration at the microphone.

Disclosed methods can include varying an amount of mechanical coupling between a microphone and two speakers in a speakerphone by receiving an input signal, sending a copy of the input signal to a first speaker, performing a signal transformation on the input signal to produce a transformed input signal, and transmitting the transformed input signal to a second speaker, where the first speaker generates a first vibration force in response to the input signal, and the second speaker generates a second vibration force in response to the transformed input signal, the second vibration force being in an opposite direction to that of the first vibration force and offsetting at least part of the first vibration force.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
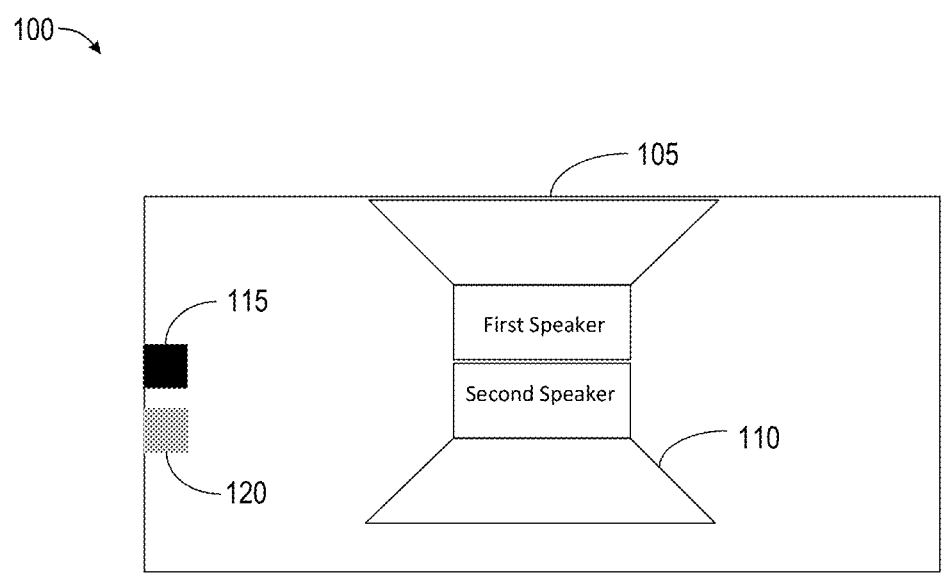
FIG. 1 is a schematic representation of an improved speakerphone where mechanical coupling has been reduced.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings. In the following material, indications of direction, such as "top" or "left," are merely to provide a frame of reference during the following discussion, and are not intended to indicate a required, desired, or intended orientation of the described articles.

One of the key challenges in designing high-quality speakerphones is minimizing mechanical coupling. The coupling is particularly more evident in small speakerphones where the distance between the one or more microphones and the speaker is small. In general, the amount of mechanical vibration at a microphone is reduced by a factor of $1/R^2$, where R is the distance between the speaker and the microphone. Thus, when the distance, R, is small, there is more mechanical coupling. The limited space also restricts the use of possible methods that can be used to minimize this coupling.

Another restriction on the use of possible techniques to reduce the mechanical coupling between a speaker and microphone is caused because of the type of mechanical coupling generated in a speakerphone. In general, mechanical coupling between the microphone and the speaker includes significant amounts of non-linear coupling. This can be problematic, as linear filters used for echo cancellation cannot remove this type of non-linear coupling. As a result, a non-linear echo canceler or echo suppression needs to be used to reduce the non-linear coupling. The use of a non-linear echo canceler, however, tends to make the speakerphone more simplex, thus reducing a user's ability to hear a person on the other end of the line, when the user is speaking. A non-linear echo canceler also makes the signal processing more demanding, rising the performance requirements and thus cost of signal processing unit.

In the present implementations, various techniques are used to minimize mechanical coupling by designing a speakerphone that utilizes two speakers or a combination of a speaker and an actuator, where the second speaker or actuator generates vibrations with an equal but opposing force of vibrations generated by the first speaker, such that the net vibration force from the speakers or speaker and actuator combination becomes close to zero.

As will be understood by persons of skill in the art upon reading this disclosure, benefits and advantages provided by such implementations can include, but are not limited to, a solution to the problem of designing high-quality speakerphones that are small in size and provide a duplex device which enables the user to talk and hear the person on the side at the same time. Solutions and implementations provided here improve the quality of the speakerphone by reducing the amount of mechanical coupling, while keeping the size of the speakerphone small. Moreover, the design is simple and inexpensive to implement and can circumvent the need for using means to tie down other elements in the speakerphone to reduce vibration, thus saving design and production costs.

Referring now to the drawings, FIG. 1 is a schematic representation of a simplified example speakerphone 100, which can be utilized to reduce mechanical coupling, in accordance with one or more aspects of the present implementations. Speakerphone 100 includes, among other features, a first speaker 105 and a second speaker 110, with the second speaker 110 having similar features as those of the first speaker 105. For example, the second speaker 110 may be of approximately the same size, the same mass, and use the same amount of power as that of the first speaker 105. In one implementation, the first and the second speakers are identical, such that when the same input signal is received by the first and the second speakers 105 and 110, the amount of vibration force caused as of result of the acoustic signal generated by each speaker is approximately the same. In such a configuration, because the speakers are facing in opposite directions, the vibration force generated by each speaker is the same but directed in opposite directions. As a result, according to Newton's third law, the net vibration force becomes close to zero.

In speakerphone 100, the first speaker 105 is positioned directly above the second speaker 110, in a back to back configuration, with the first speaker 105 and the second speaker 110 facing the opposite directions, such that any vibration force generated by the first speaker can be directly counteracted by the amount of vibration force generated by the second speaker. In an alternative implementation, first and second speakers 105 and 110 may reverse positions such that the second speaker 110 is positioned directly above the first speaker 105. This would not change the effects of the vibration forces. In an alternative implementation, the configuration may be rotated 90 degrees so that the speaker cones are facing left and right instead of up and down. This would not change the effects of the vibration forces.

In yet another implementation, the second speaker 110 may not be positioned directly below the first speaker 105. For example, the second speaker 110 may be positioned slightly to the left or to the right of the first speaker 105. This may occur, because of design requirements or space restrictions. Because of the small size of the speakerphone 100, a slight movement to the side of the second speaker 110 would generally not change the effectiveness of the counteractive vibration forces.

In speakerphone 100, the second speaker 110 is attached to the first speaker 105. This may maximize the canceling effects of the counteractive vibration forces generated by the second speaker 110, as discussed further below, or may simply be done to keep the second speaker 110 in place. Alternatively, the second speaker 110 may simply be positioned below the first speaker, without the two speakers being directly attached. In such a configuration, a rigid coupler may be used between the speakers. In one implementation, the second speaker 110 may include a low-pass filter at a frequency, such as 1000 Hz, which is the frequency range that most vibrations are created. By filtering out the high frequencies there is no phase interference in the high frequencies.

Speakerphone 100 also includes a microphone 115 and a vibration measurement unit, such as, an accelerometer 120. In one implementation, accelerometer 120 is mounted next to the microphone to detect the amount of vibration present around the microphone. This is because even with the opposing vibration forces generated by the second speaker 110, there may still be some vibration present around the microphone. The accelerometer can detect the presence of vibration and determine the amount of it. The accelerometer may have a sample rate of 2 KHz or more. Alternatively, a bone-conducting microphone can be used which acts like an accelerometer. In alternative implementations, the accelerometer 120 may be located close to the first speaker or the second speakers 105 and 110 for measuring the vibration at its source. The accelerometer may also be located anywhere else inside the speakerphone.

The information collected by the accelerometer can be used in a feedback mechanism to transform the input signal sent to the second speaker 110 to change the parameters of the vibration force generated by the second speaker 110 in order to minimize the amount of mechanically coupled vibration at the microphone. This feedback mechanism is discussed in more detail below. In one implementation, an accelerometer may be used during manufacturing of the speakerphone to perform a factory tuning. In this manner, the amount of vibration may be determined once during tuning at the factory. This amount may then be used during the life of the speakerphone to adjust the input signal sent to the second speaker 110. By using this technique, the need for including the accelerometer in the speakerphone 100 may be eliminated, resulting in cost and space savings in the speakerphone 100. Alternatively, the accelerometer 120 may be included in the system 100 as shown to perform live adjustments over the life of the product. This may be useful since, because of different temperatures and/or other changes occurring as the product ages, the performance of the first and/or the second speakers 105 and 110 may change.

Microphone 115 can be any microphone suitable for a speakerphone device. The microphone may be positioned on a rubber boot, may be directly glued to a surface of the speakerphone 100, or may be positioned on a Power Control Panel (PCP) or Printed Circuit Board (PCB) of the speakerphone 100. In one implementation, more than one microphone may be present. In such a configuration, depending on the location of the additional microphones, one or more additional accelerometers may be used to detect vibration around each of the microphones. For example, if the second microphone is on the other side of the first and the second speakers 105 and 110, then a second accelerometer may be utilized. The output of the multiple accelerometers may then be used in a transform function calculated to minimize the amount of vibration as much as possible around each of the several microphones. If, however, the second microphone is on the same side and/or close to the first microphone, then the same accelerometer may suffice for detecting the presence and amount of vibration around both microphones. In an alternative implementation, the accelerometer is placed on the frame or magnet of one of the speakers, or close to them, to measure and minimize the vibration at the source, thus minimizing the vibration coupled to the microphones.

By providing a second speaker 110 that generates nullifying vibration forces, speakerphone 100 can minimize mechanical vibrations at its source. In addition to reducing mechanical coupling between the speaker 105 and the microphone 115, this also minimizing vibrations throughout the entire device. As a result, the improved speakerphone 100 eliminates the need for wrapping loose wires and/or utilizing tie-downs for various other components of the speakerphone which might otherwise cause distortion when they vibrate. This results in a simpler design which reduces expenses associated with designing and manufacturing the improved speakerphone. The resulting speakerphone can be have a volume as small as less than 10 cubic centimeters.

Figure 2A:
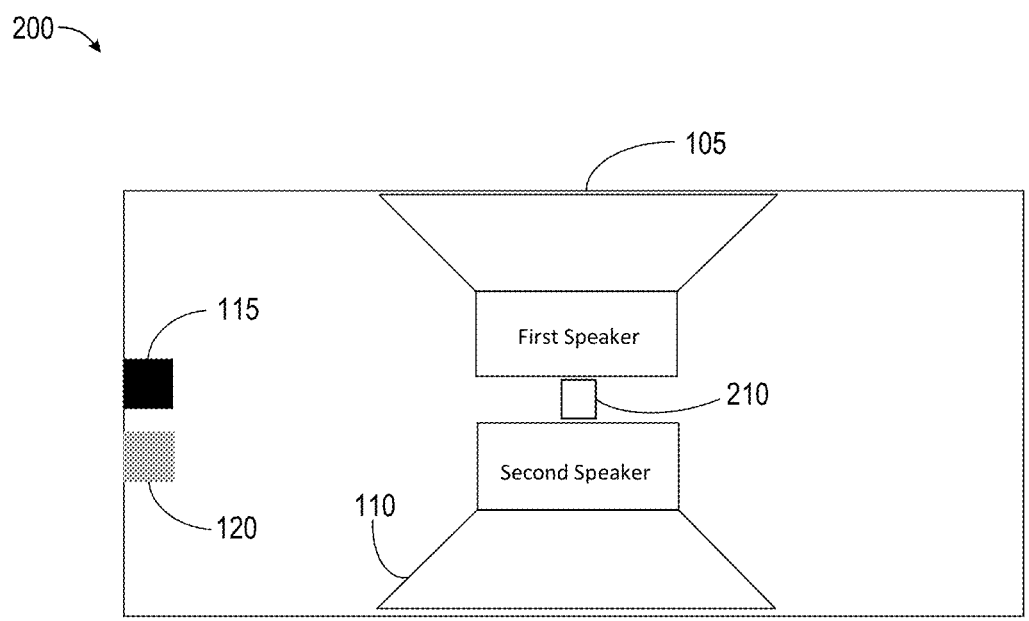
FIGS. 2A-2B are schematic representations of alternative improved speakerphones where mechanical coupling has been reduced.

FIG. 2A is a schematic representation of an alternative improved speakerphone 200, which can be utilized to reduce mechanical coupling. Like speakerphone 100, speakerphone 200 includes a first speaker 105, a second speaker 110, a microphone 115, and an accelerometer 120. The components have similar features and characteristics as those of speakerphone 100, and as such, will not be discussed here in detail.

In speakerphone 200, instead of the speakers being positioned directly back to back, a mechanical coupling block 210 is positioned in between them. The mechanical coupling block may be a rigid block such as a plastic part. This may be necessitated, for example, by design parameters of the speakerphone 200. Even though, the first and the second speakers 105 and 110 are not back to back, in this implementation, the vibration forces generated by the second speaker 110 can still nullify those generated by the first speaker 105. However, because the first and the second speakers 105 and 110 are located in different places within the speakerphone 200, they may be in two different acoustical environments and thus may radiate differently. As a result, the input signal sent to the second speaker 110 may be passed through a filter first, to ensure that the counteractive vibration forces generated by the second speaker 110 have the desired effect of nullifying mechanical vibrations at the microphone location.

Figure 2B:
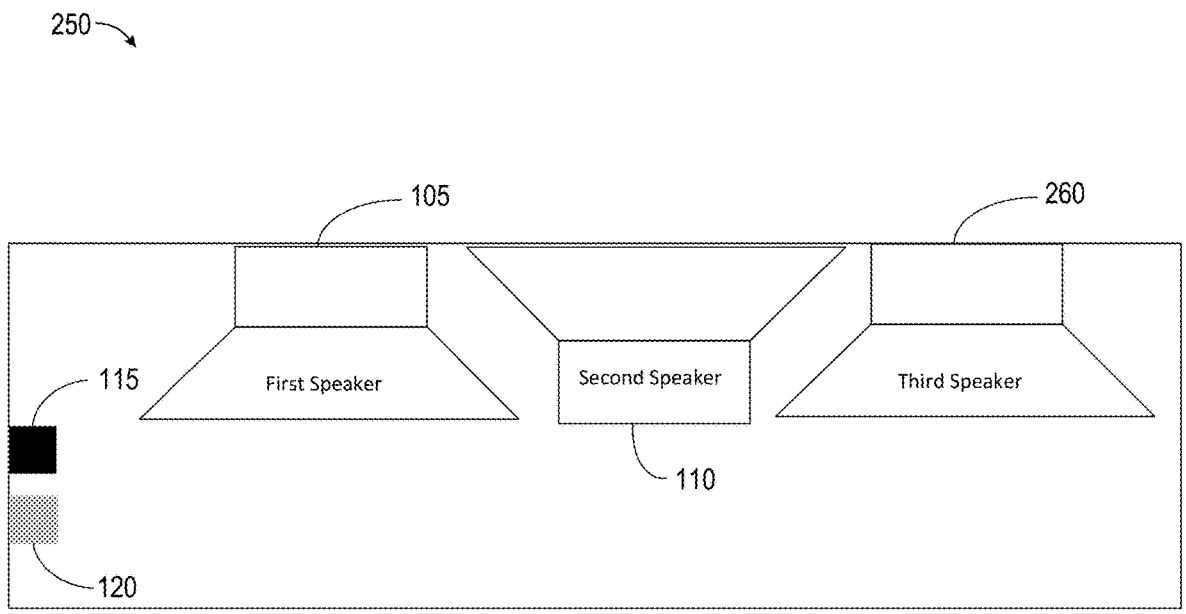

FIG. 2B is a schematic representation of another alternative improved speakerphone 250, which can be utilized to reduce mechanical coupling. Like speakerphones 100 and 200, speakerphone 250 includes a first speaker 105, a second speaker 110, a microphone 115, and an accelerometer 120. These components have similar features and characteristics as those of speakerphones 100 and 200, and as such, will not be discussed here in detail. Speakerphone 250 also includes a third speaker 260.

In speakerphone 250, the third speaker 260 faces the same direction as that of the first speaker 105, while the second speaker 110 faces the opposite direction. This may be necessitated by design parameters of the speakerphone 250. In such a configuration, the input signals sent to the second speaker 110 and the third speaker 260 may be generated such that the sum of vibration forces generated by the first, second and third speakers in the x and y directions is close to zero.

Figure 3:
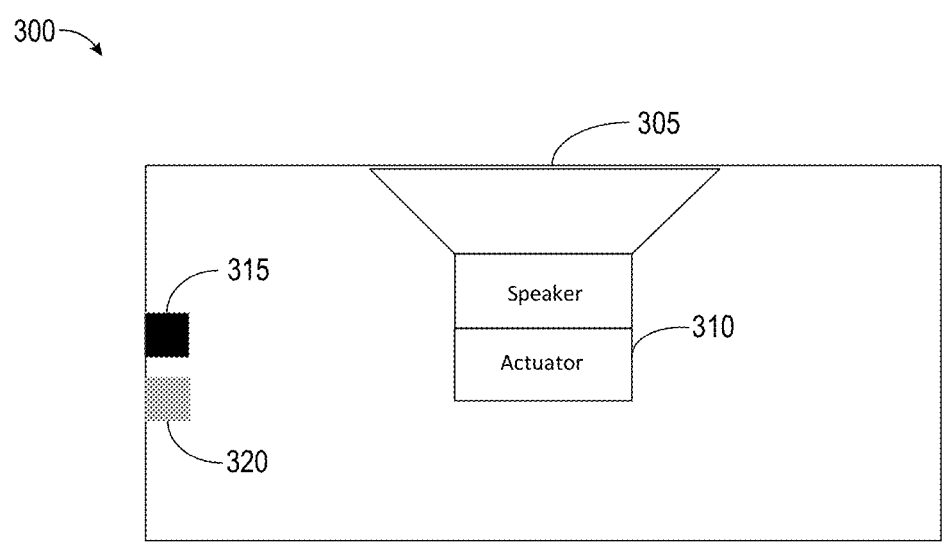
FIG. 3 is a schematic representation of an improved speakerphone where mechanical coupling has been reduced by using an actuator.

FIG. 3 is a schematic representation of an improved speakerphone 300 which uses an actuator and can be utilized to reduce mechanical coupling. Speakerphone 300 includes a speaker 305, an actuator 310, a microphone 315, and an accelerometer 320. The speaker 305, microphone 315, and accelerometer 320 have similar features and characteristics as similar components of speakerphone 100, and as such, will not be discussed here in detail.

The actuator 310, in one implementation, is a speaker without a cone. Because the actuator 310 does not have a cone, it can face any direction. The use of the actuator 310 may be advantageous, as it occupies less space than a speaker, while still achieving the same nullifying results. In general, the actuator 310 has a different moving mass than that of a speaker and a different sensitivity. As a result, in one implementation, the input signal sent to the actuator 310 could not be the same as the input signal sent to the speaker 305. Instead, a copy of the same signal sent to the speaker 305 would need to receive phase and/or amplitude transformation for the actuator to generate an equal but opposite vibration force as that of the speaker 305. In an alternative implementation, the actuator 310 may have a moving mass that is close to the moving mass of the speaker 305, and motors of the speaker 305 and actuator 310 may have similar enough characteristics at the frequency range of interest. In such a configuration, the same input signal sent to the speaker 305 may be sent to the actuator 310 for optimal reduction of vibration.

Figure 4:
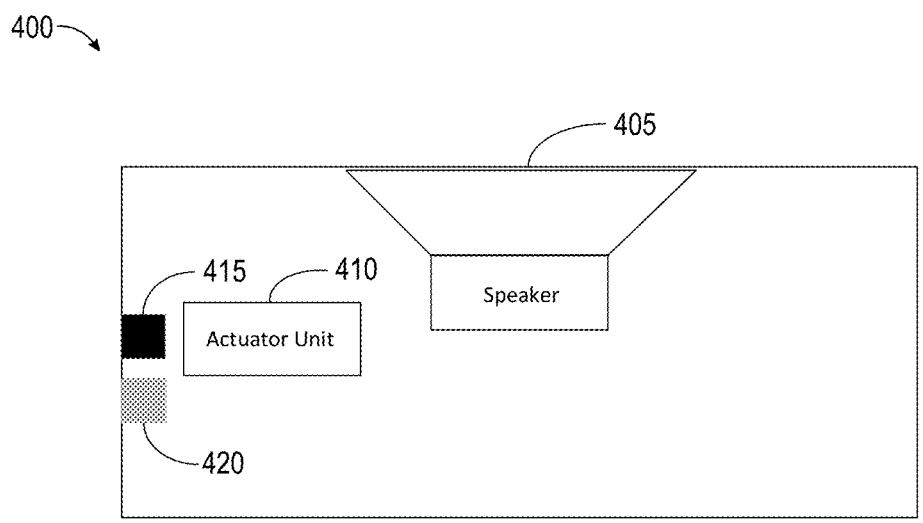
FIG. 4 is a schematic representation of an alternative improved speakerphone where mechanical coupling has been reduced by using an actuator.

FIG. 4 is a schematic representation of an alternative improved speakerphone 400 using an actuator, which can be utilized to reduce mechanical coupling. Speakerphone 400 includes a speaker 405, an actuator unit 410, a microphone 415, and an accelerometer 420. The speaker 405, microphone 415, and accelerometer 420 have similar features and characteristics as similar components of speakerphone 300, and as such, will not be discussed here in detail. The actuator unit 410 may include one, two or three actuators in the x, y and z directions. This is because the vibrations at the speakers are primarily in the z-axis, but at the microphone they can be in the x, y and z direction. For improved reduction of vibrations at the microphone location, two or three one-dimensional actuators may be needed.

In speakerphone 400, instead of being positioned back to back with the speaker 405, the actuator 410 is located next to the microphone 415. In one implementation, the actuator unit 410 may be positioned on the microphone. The actuator unit 410 may also be attached to the microphone 415. The proximity of the actuator unit 410 to the microphone 415 may be necessitated by design parameters of the speakerphone 400 or so that vibrations are canceled at the microphone. Although, the speaker 405 and actuator unit 410 are not back to back in speakerphone 400, the vibration forces generated by the actuator 410 can still cancel out those generated by the speaker 405. However, because the speaker 405 and the actuator 410 are located in different places within the speakerphone 400, the coupling from the speaker 405 to the microphone 415 may be different from the coupling from the actuator 410 to microphone 415. Thus, the input signal sent to the speaker 405 may need more modification before being sent to the actuator unit 410, to ensure that the counteractive vibration forces generated by the actuator unit 410 have the desired nullifying effect at the microphone.

Figure 5:
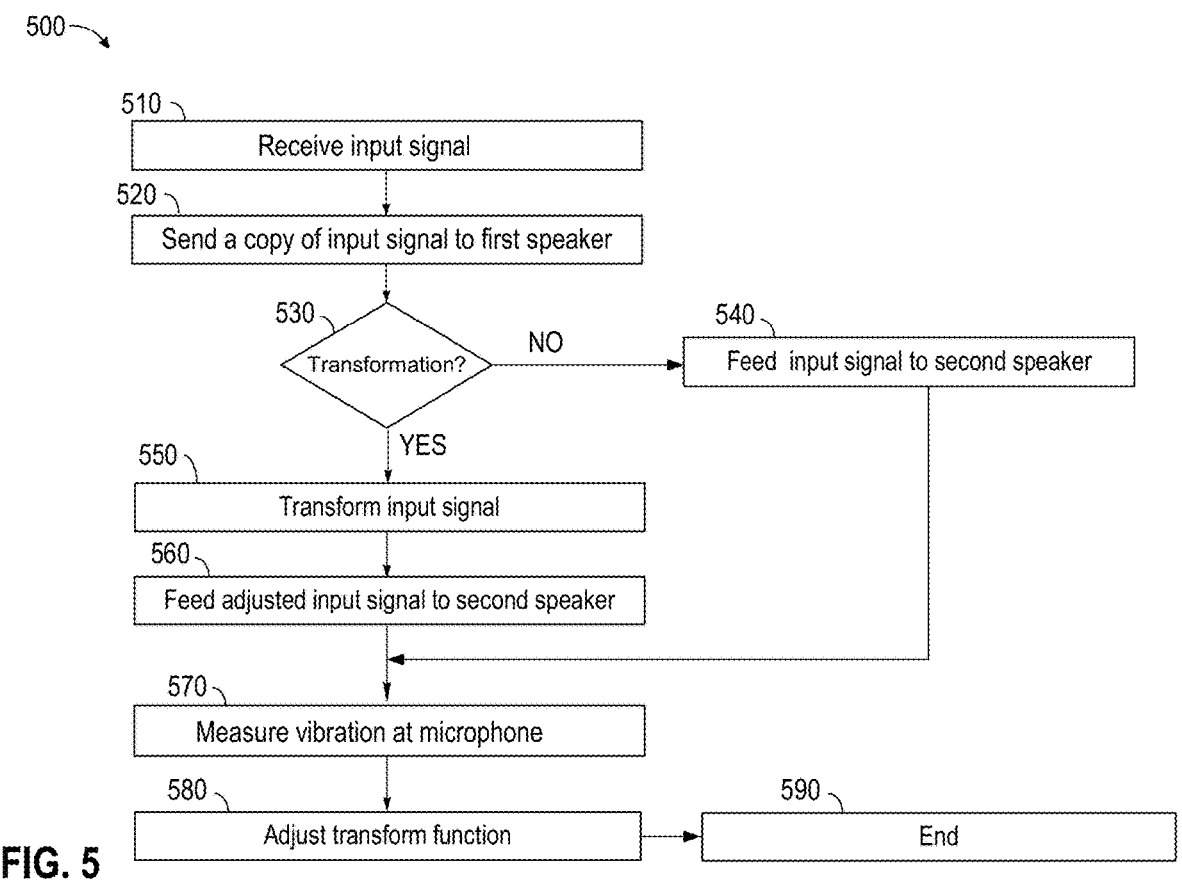
FIG. 5 is a flow diagram for a method for adjusting the amount of mechanical coupling between one or more speakers and one or more microphones in a speakerphone.

FIG. 5 is a flow diagram depicting an exemplary method 500 for adjusting the amount of mechanical coupling between one or more speakers and one or more microphones in a speakerphone, which may be performed, for example, using the system 100 illustrated in FIG. 1. At 510, the method 500 includes receiving an input signal for the first speaker. This may be the electrical signal that is received by a speakerphone for generating sound. In general, in prior art speakerphones, this signal is sent directly to the speaker to produce sound. In method 500, however, the received signal is split into two with a copy being sent directly to the first speaker to generate sound in a normal manner, at 520, while another copy is kept for the second speaker, as discussed further below.

Method 500 determines, at 530, whether transformation is needed for the signal received by the speakerphone, before a copy of it is sent to the second speaker. This is determined by examining the speakerphone's configuration and environment to determine if any transformation is needed for the input signal of the second speaker to generate equal but opposing vibration forces that can nullify the effects of the vibration forces generated by the first speaker. In the configuration used in speakerphone 100 of FIG. 1, the amount of transformation needed may be minimal because of the back to back position of the first and second speakers. In that implementation, because the two speakers are, for the most part identical and they face opposite directions, a phase shift may not be needed to generate equal but opposing vibration forces by the two speakers. However, because of the different acoustical environments that the two speakers may be located in, some transformation may still be needed to achieve the desired nullifying results. The transformation in speakerphone 100 may involve applying a filter, such as a low pass filter. In alternative speakerphone implementations, more transformation may be needed. For example, in speakerphone 250 of FIG. 2B, where the two speakers are facing the same direction, a 180 degrees phase transformation may be needed for the signal sent to the second speaker.

In one implementation, the need for transformation and the type of transformation needed is also determined by examining a mode of operation for the speakerphone. This is because, during a music mode, when the speakerphone is being used as solely a speaker, there may not be a need for reducing mechanical coupling. In fact, more mechanical vibration may be desirable to make the sounds produced more pleasing. For example, vibrating a table on which the speakerphone is placed may make low frequency sounds more audible, which makes the music generated by the speakerphone sound more pleasing.

In such an implementation, the device may have a music mode that, instead of reducing mechanical vibrations of the body of the device, increases it. This may be done by first determining whether the device is playing music or is being used as a speakerphone. This determination can be made, for example, by detecting if the microphone is open or not. When the microphone is not open, and the speaker is generating sound, the system may decide that it is in music mode or the microphone is muted, in which case there is no fear of echo and thus no need to reduce coupling. The speakerphone may also have selectable modes that can be chosen by a user. Once the system determines that it is in music mode, then it may adjust the transform function used to transform the input signal sent to the second speaker or actuator such that it generates more vibration.

If it is determined, at 530, that a transformation is not needed for the input signal, then the copy of the original signal received by the speakerphone is fed into the second speaker, at 540, before method 500 proceeds to step 570, as discussed further below. This may occur, in a back to back speaker configuration, such as the one in speakerphone 100, when it is determined that no filtration is needed to achieve the desired nullifying results.

When it is determined that a transformation is needed, method 500 proceeds to apply the required transformation, at 550. This may be done, in one implementation, by first determining the type and amount of transformation needed. This can be achieved by determining the optimal phase and gain change required in order to minimize the root mean square (rms) of acceleration measured at the accelerometer for the same frequency range. In one implementation, the rms of acceleration has been measured previously (either during a previous live use or during factory tuning) and the amount is used to adjust a transform function used to transform the input signal. In one implementation, the transform function is a non-linear transform function in either time or frequency domain. In the frequency domain, method 500 may transform the signal per frequency or on a total wide-band basis.

Once the predetermined transformation is applied, the adjusted signal is fed into the second speaker and/or actuator, as the case may be, at 560, so that the second speaker can generate the desired vibration forces to counteract those of the first speaker. Method 500, then, at 570, measures the amount of vibration at the microphone using an accelerometer, such as the accelerometer 120 of speakerphone 100. That is because even if prior measurements or tuning have helped shape the transform function, environmental causes may alter the speakerphone such that vibration still exists. Measuring the amount of vibration enables the system to adjust its transform function, as needed, thus creating a live feedback loop. As a result, once the amount of vibration is measured, method 500 proceeds to adjust the transform function, as needed, at 580. In this manner, the transform function accounts for current vibration e, as the input signal continues arriving at the speakerphone or for future input signals. After the transform function has been adjusted, method 500 proceeds to end, at 590.

Apparatuses and methods of adjusting mechanical vibration in a speakerphone are described. Methods can include receiving a signal for a speaker, sending a copy of the signal to a first speaker, determining if a transformation is needed for the signal before being sent to a second speaker and transforming the signal accordingly, sending the transformed signal to the second speaker, measuring the amount of vibration at a microphone in the speakerphone, and adjusting a transform function for the input signal based on the amount of vibration detected at the microphone.

Apparatuses may include a first speaker that receives an input signal and generates sound creating a vibration force, a second speaker or an actuator located near the first speaker for generating a vibration force to either counteract or reinforce the vibration force of the first speaker, a microphone, and an accelerometer for measuring the amount of vibration.

Generally, functions described herein (for example, the features illustrated in FIGS. 1-5) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are platform-independent, meaning that the techniques may be implemented on a variety of computing platforms having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system comprising:
   a microphone;
   a first speaker configured for receiving a first input signal and producing a first vibration force;
   a signal transformation unit configured for transforming the first input signal into a second input signal;
   a second speaker configured for receiving the second input signal; and
   a coupling block positioned between the first speaker and the second speaker;
   wherein:
      the first speaker faces a first direction and the second speaker faces a second direction opposite that of the first direction, and
      the second speaker is configured to be responsive to the second input signal to produce a second vibration force that is in an opposite direction to that of the first vibration force produced by the first speaker and the second vibration force offsets at least part of the first vibration force produced by the first speaker.

2. The system of claim 1, wherein the signal transformation unit is a transform function.

3. The system of claim 1, wherein the signal transformation unit is a low-pass filter.

4. The system of claim 1, further comprising a mechanical coupling measurement unit for measuring an amount of vibration at the microphone.

5. The system of claim 4, wherein the amount of vibration at the microphone is caused by the first and the second speakers.

6. The system of claim 4, wherein the mechanical coupling measurement unit is an accelerometer.

7. The system of claim 4, wherein the first speaker has a first mass, the second speaker has a second mass, and the second mass is approximately equal to the first mass.

8. The system of claim 1, wherein the coupling block is a rigid block.

9. A system comprising:
a microphone;
a first speaker configured for receiving a first input signal and generating a first vibration force;
a signal transformation unit receiving the first input signal and performing a signal transformation thereon to produce a transformed input signal for varying an amount of mechanical vibration at the microphone; and
a second speaker configured for receiving the transformed input signal and generating a second vibration force;
wherein the second vibration force is in an opposite direction to that of the first vibration force and offsets at least part of the first vibration force to vary the amount of mechanical vibration at the microphone.

10. The system of claim 9, wherein the combination of the first vibration force and the second vibration force reduces the amount of mechanical vibration at the microphone.

11. The system of claim 9, wherein the second speaker is coneless.

12. The system of claim 9, further comprising a mechanical vibration measurement unit that measures the amount of mechanical vibration.

13. The system of claim 9, further comprising a third speaker configured for receiving another transformed input signal and generating a third vibration force, wherein the combination of the first vibration force, the second vibration force, and the third vibration force varies the amount of mechanical vibration at the microphone.

14. A method for varying an amount of mechanical coupling between a microphone and two speakers in a speakerphone comprising:
receiving an input signal;
sending a copy of the input signal to a first speaker;
performing a signal transformation on the input signal to produce a transformed input signal; and
transmitting the transformed input signal to a second speaker;
wherein:
the first speaker generates a first vibration force in response to the input signal, and
the second speaker generates a second vibration force in response to the transformed input signal, the second vibration force being in an opposite direction to that of the first vibration force and offsetting at least part of the first vibration force.

15. The method of claim 14, further comprising measuring an amount of vibration caused by the first and the second speakers.

16. The method of claim 15, wherein performing the signal transformation comprises transforming the input signal based at least in part on the amount of measured vibration.

17. The method of claim 14, wherein offsetting at least part of the first vibration force reduces the amount of mechanical coupling.

18. The method of claim 14, wherein performing the signal transformation on the input signal comprises applying a transform function to the input signal.

19. The method of claim 18, wherein the transform function is a non-linear transform function.

* * * * *